United States Patent
King

(10) Patent No.: US 10,169,974 B2
(45) Date of Patent: Jan. 1, 2019

(54) HOME SECURITY SYSTEM

(71) Applicant: Rudolf King, Altenstadt (DE)

(72) Inventor: Rudolf King, Altenstadt (DE)

(*) Notice: Subject to any disclaimer, the term of this patent is extended or adjusted under 35 U.S.C. 154(b) by 124 days.

(21) Appl. No.: 15/544,266

(22) PCT Filed: Jul. 6, 2015

(86) PCT No.: PCT/EP2015/065387
§ 371 (c)(1),
(2) Date: Jul. 18, 2017

(87) PCT Pub. No.: WO2016/071009
PCT Pub. Date: May 12, 2016

(65) Prior Publication Data
US 2018/0025609 A1    Jan. 25, 2018

(30) Foreign Application Priority Data
Nov. 6, 2014 (DE) .................... 20 2014 007 763 U

(51) Int. Cl.
| | |
|---|---|
| G08B 21/04 | (2006.01) |
| H04N 5/33 | (2006.01) |
| H04W 4/02 | (2018.01) |
| G08B 25/01 | (2006.01) |
| G08B 25/00 | (2006.01) |
| H04W 76/10 | (2018.01) |
| G08B 21/02 | (2006.01) |

(52) U.S. Cl.
CPC ....... *G08B 21/0492* (2013.01); *G08B 25/001* (2013.01); *G08B 25/008* (2013.01); *G08B 25/016* (2013.01); *H04N 5/33* (2013.01); *H04W 4/02* (2013.01); *H04W 76/10* (2018.02); *G08B 21/023* (2013.01); *Y02D 70/1222* (2018.01); *Y02D 70/1224* (2018.01); *Y02D 70/142* (2018.01); *Y02D 70/144* (2018.01); *Y02D 70/164* (2018.01); *Y02D 70/166* (2018.01); *Y02D 70/23* (2018.01); *Y02D 70/26* (2018.01)

(58) Field of Classification Search
None
See application file for complete search history.

(56) References Cited

U.S. PATENT DOCUMENTS

| | | | |
|---|---|---|---|
| 2012/0229634 A1* | 9/2012 | Laett ................... | G08B 21/043 348/143 |
| 2014/0267718 A1* | 9/2014 | Govro ................... | G06Q 50/22 348/143 |

* cited by examiner

Primary Examiner — Hung Q Dang

(57) ABSTRACT

A home security system and method is provided. The method comprises detecting a motion in a monitored room, starting data collection through at least a first sensing device and a second sensing device, transmitting said collected data to a computing device comprising a data analysis unit, detecting a potentially dangerous situation through the data analysis unit by analyzing said collected data, transmitting a relevant snippet of data of said first sensing device to a first randomly selected service center server, evaluating said snippet of data through a first service center operator as being related to "definitely a dangerous situation", "definitely no dangerous situation" or "unclear", if "unclear" was chosen, transmitting the snippet of data to a second randomly selected service center server, and transmitting the snippet of data along with the evaluation of the first operator from the second randomly selected service center server to the computing device.

16 Claims, 3 Drawing Sheets

HOME SECURITY SYSTEM

The present invention relates to a home security system and method. More particularly, the present invention provides a home security system and method improving security at home for elder people without limiting the privacy of or convenience for residents.

TECHNICAL BACKGROUND

The present generation of elderly people remains more active than ever. Rather than moving into specially observed homes and retirement homes, they regard their own homes, having lived there for a long time, the ideal place to live after retirement and arrange themselves accordingly. This is a generational change that has happened only within the last 15 to 25 years. Before then, retirees usually considered moving to a retirement home or a living facility at a much earlier age than nowadays. Presently, retirement homes are used more to help those with pressing diseases such as dementia or other ailments requiring around-the-clock care.

Elderly people are susceptible to disastrous incidents like stroke, heart attack, or falls due to fainting. However, due to said societal changes, retirees without supervision will most likely not receive the required immediate help in such cases.

Therefore, security systems were developed basically comprising of easy and cost-efficient to install cheap surveillance materials in every room, from the bathroom to the kitchen, telecasting every movement to a supervision centre, much like the 'Big Brother" TV series of the early millennium. However, this is an unacceptable invasion of privacy. Furthermore, constant supervision of such systems would not be financially viable as it constantly demands manpower to attend and supervise even a single-person household. Thus, there is a need for a cost-effective home security system and method increasing home security without negative influence on the resident's privacy or convenience.

BRIEF DESCRIPTION OF THE INVENTION

The present invention relates to a home security system and method. More particularly, the present invention provides a home security system and method improving security at home for elder people without limiting the privacy of or convenience for residents.

The home security method according to the present invention comprises detecting a motion in a monitored room (10) through a motion sensor; starting data collection through at least one first sensing device and at least one second sensing device; transmitting said collected data to a computing device comprising a data analysis unit; detecting a potentially dangerous situation through the data analysis unit by analyzing said collected data; transmitting a relevant snippet of data of said first sensing device from the computing device to a first randomly selected service center server; evaluating said snippet of data of said first sensing device through a first service center operator as being related to "definitely a dangerous situation", "definitely no dangerous situation" or "unclear"; if "unclear" was chosen by said operator, transmitting the evaluation of the first operator from the first randomly selected service center server to the computing device.

The term "snippet" presented herein refers to a part ("snippet") of collected date. E.g. if the first sensing device is a Video camera, a snippet of collected video data could be only a small part of the whole relevant video, a video still (i.e. a single image of the video) or a series of video stills, e.g. in one second or two second time intervals, or only the audio information of the captured video. Likewise, snippets of IR video can be stills of the IR video or snippets of Audio information captured by a microphone are only shorts bursts of audio. However, these examples are not provided to limit the present invention and the skilled person may apply other "snipping" of collected data and may even combine snippets of different sources to a "snippet". Said snipping of data is performed to protect the private sphere of residents. Since an operator may only look at a snippet of data which is not correlated to personal information like name or address of the resident, the privacy of the resident is protected.

In a second embodiment of the present invention the method further comprises transmitting a relevant snippet of data of said second sensing device from the computing device to a second randomly selected service center server; evaluating said snippet still of data of said second sensing device through a second service center operator as being related to "definitely a dangerous situation", "definitely no dangerous situation" or "unclear"; if "unclear" was chosen by said second operator, transmitting evaluation of the second operator from the second randomly selected service center server to the computing device.

In a third embodiment of the present invention the method of the second embodiment further comprises, if said second service center operator selected "unclear", transmitting a snippet of data of a third sensing device from the computing device to a third randomly selected service center server; evaluating the snippet of data of the third sensing device through a third service center operator as being related to "definitely a dangerous situation", "definitely no dangerous situation" or "unclear"; if "unclear" was chosen by said third operator, transmitting the evaluation of the third operator from the third service center server to the computing device.

In a fourth embodiment of the present nvention the method of the third embodiment further comprises, if said third service center operator selected "unclear", transmitting the complete relevant data of data of said second sensing device from the computing device to a fourth randomly selected service center server; evaluating the snippet of data through a fourth service center operator as being related to "definitely a dangerous situation", "definitely no dangerous situation" or "unclear"; if "unclear" was chosen by said fourth operator, transmitting the evaluation of the fourth operator from the fourth service center server to the computing device.

Herein, the term "complete relevant data" means that the previously defined process of producing a snippet is partly or completely omitted and full relevant data of one or more sensing devices are transmitted. However, these examples are not provided to limit the present invention and the skilled person may apply other "complete relevant data" of collected data and may even combine relevant date of different sources to a "set of complete relevant data".

In a fifth embodiment of the present invention the method of the third embodiment further comprises, if said fourth service center operator selected "unclear", transmitting the complete relevant data of the third sensing device from the computing device to a fifth randomly selected service center server; and evaluating the complete relevant data through a fifth service center operator as being related to "definitely a dangerous situation" or "definitely no dangerous situation".

In a sixth embodiment of the method of the present invention the case is closed if an operator selects "definitely no dangerous situation" and the case is forwarded to suitable authorities if an operator selects "definitely a dangerous situation".

In a seventh embodiment of the method of the present invention the method is continued until at least two different operators evaluated the situation as "definitely a dangerous situation" or "definitely no dangerous situation". If the second operator does not agree with the first operator with none stating "unclear", the result of the evaluation is considered "definitely a dangerous situation" and the alarm sequence is being started by one of the operators.

In a eighth embodiment of the method of the present invention the first service center server assigns the first data snippet with a case number, wherein the case number contains no information about the location of the monitored room (10).

In a ninth embodiment of the method of the present invention the method is continued until at least two different operators evaluated the situation as "definitely no dangerous situation"; if the second operator does not agree with the first operator with none stating "unclear", the result of the evaluation is considered "definitely a dangerous situation" and the alarm sequence is being started by one of the operators.

In an tenth embodiment of the invention, the service center sequence of embodiments 1-9 is not randomly selected, but preset by the service center. In a eleventh embodiment of the invention, there is only one service center in embodiments 1-9, still the sequence of snippets transmission is continued.

In an twelfth embodiment of the invention, all data in embodiments 1-11 is transferred at once to the service center server and the service center server without at first making new contact with the computing device sends the data snippets in sequence to the service center operators for evaluation.

The present invention further provides a home security system, comprising at least one home security unit installed in a room to be monitored, comprising a motion sensor; a first sensing device; and a second sensing device; and a computing device, comprising a data analysis unit, wherein the home security system is adapted for detecting a motion in a monitored room through a motion sensor; starting data collection through the first sensing device and the second sensing device; transmitting said collected data to the computing device; detecting a potentially dangerous situation through the data analysis unit by analyzing said collected data; transmitting a relevant snippet of data of said first sensing device from the computing device to a first randomly selected service center server; evaluating said snippet of data of said first sensing device through a first service center operator as being related to "definitely a dangerous situation", "definitely no dangerous situation" or "unclear"; if "unclear" was chosen by said operator, transmitting the evaluation of the first operator from the first randomly selected service center server to the computing device.

In an thirteenth embodiment of the present invention the home security system is further adapted for transmitting a relevant snippet of data of said second sensing device from the computing device to a second randomly selected service center server; evaluating said snippet of data of said second sensing device through a second service center operator as being related to "definitely a dangerous situation", "definitely no dangerous situation" or "unclear"; if "unclear" was chosen by said second operator, transmitting the evaluation of the second operator from the second service center server to the computing device.

In an fourteenth embodiment of the present invention the home security system is further adapted for if said second service center operator selected "unclear", transmitting a snippet of data of a third sensing device from the computing device to a third randomly selected service center server; evaluating the snippets of data of said first and second sensing device through a third service center operator as being related to "definitely a dangerous situation", "definitely no dangerous situation" or "unclear"; if "unclear" was chosen by said third operator, transmitting the evaluation of the third operator from the third service center server to the computing device.

In an fifteenth embodiment of the present invention the home security system is further adapted for if said third service center operator selected "unclear", transmitting the complete relevant data of said first sensing and said second sensing device from the computing device to a fourth randomly selected service center server; and evaluating the data of said first and second sensing device through a fourth service center operator as being related to "definitely a dangerous situation" or "definitely no dangerous situation".

In an sixteenth embodiment of the present invention the home security system is further adapted for if said fourth service center operator selected "unclear", transmitting the complete relevant data of the third sensing device from the computing device to a fifth randomly selected service center server; and evaluating all data through a fifth service center operator as being related to "definitely a dangerous situation" or "definitely no dangerous situation".

In an seventeenth embodiment of the present invention the case is closed if an operator selects "definitely no dangerous situation" and the case is forwarded to suitable authorities if an operator selects "definitely a dangerous situation".

In an eighteenth embodiment of the present invention the method is continued until at least two different operators evaluated the situation as "definitely a dangerous situation" or "definitely no dangerous situation".

In an nineteenth embodiment of the present invention the first service center server assigns the first data snippet with a case number, wherein the case number contains no information about the location of the monitored room.

DETAILED DESCRIPTION OF THE INVENTION

Figure 1:
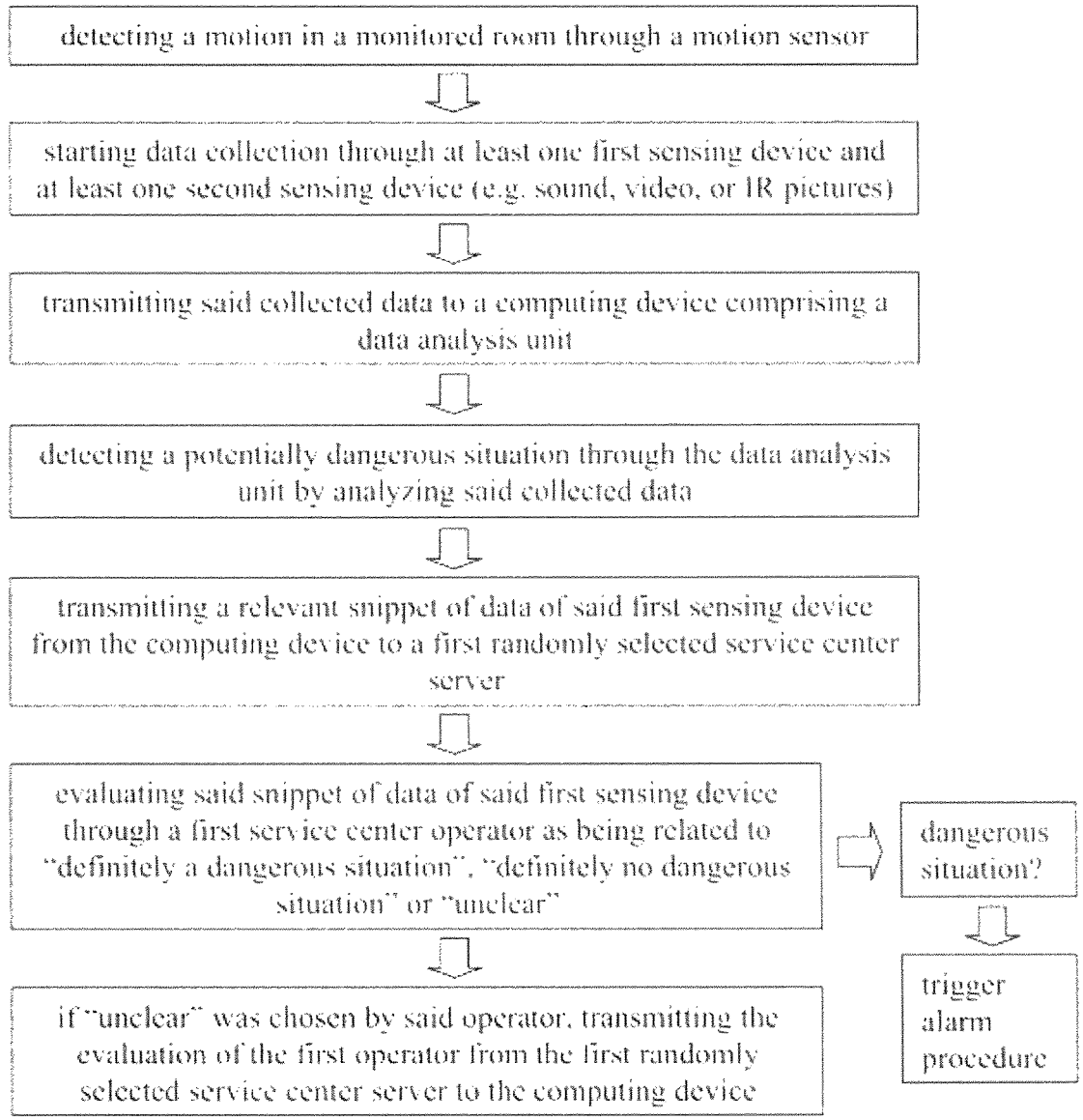
FIG. 1 is a flow chart of a home security method according to a preferred embodiment of the present invention.

The present invention provides a home security system and method increasing the safety of elder people in their homes without negative impact on the resident's privacy or convenience. The skilled person will understand that the embodiments presented herein may be combined according to personal requests or legal requirements.

In a first preferred embodiment, the system according to the present invention may comprise the following hardware. A unit according to the following hardware description is best used in every single room 10 in the home, in rooms 10 with corners or other obstructions that make the view from any one side impossible more units are needed. At least one unit in every room 10 is recommended. All units are connected to a computing device (remote server D1) for collecting the data provided by the unit and for determining which further steps should be taken. Alternatively, each unit may comprise it's on computing device and merely forward a trigger signal to a central computing device or an incident room 10 of a monitoring service or official services like fire department, police or hospital/an ambulance.

1) Movement Sensor

Once the movement detector E1 recognizes movement inside the room 10, the whole unit E goes from standby to running mode. All systems in the unit start to work. That is, the movement sensor is continuously monitoring the room 10 and triggers the remaining parts of the unit if movement is detected.

2) Microphone

The microphone E2 listens in on the room 10 and sends this information (optionally via a wireless connection) to the computing device. Said computing device may be connected to a hidden remote server D1.

3) Infrared Camera

The infrared camera E3 shoots continuously or in very short intervals, such as one second photos in the infrared light range. This helps to both detect movements in the dark and keeps the remote center unobtrusive.

4) Video Camera

Optionally, a video camera E4 may be provided, which may use a 'horizontal fish eye' lens spanning 180° or more, continuously films the interior of the room 10 until the motion detector E1 no longer tracks any movements and the remote server D1 concludes all persons have left the room 10.

5) Loudspeaker and Monitor

If the server D1 has issued a full emergency warning, the remote center tries to contact the person inside the room 10, the monitor E5-2 shows a sign of an emergency, the remote center can talk via the server D1 and units of the loudspeaker unit E5-1 to the room 10, the person inside the room 10 can talk via microphone talk back to the remote center.

6) Keypad or Touchscreen or RFID Chip

The unit F has a means of manual entry which can be either a keypad E6-1 or a touchscreen E6-2 on top of the monitor E5-2 or a RFID chip sensor E6-3. This can be used, for example, to black out the system for a certain time span and to issue a particular alarm sequence.

7) Girometer

If a person turns the unit E either horizontally facing the wall or vertically facing the ceiling or the floor (the cameras E3 and E4 no longer face the room 10), it can be concluded that criminal activity is the cause. For intimacy sake, the homeowner or resident is able to block out the unit by entering in a code, not having to move the unit E. A girometer E7, potentially used in the unit can detect this movements, can be helpful to differentiate between a decisive action or a malfunction of the cameras.

8) Alarm Switch

An alarm switch E8 can be included such that the resident may manually trigger an alert.

9) Wireless Connection

Using WiFi or another wireless connection E9 the unit E is connected with the remote server D1 and/or other units E of the home security system.

10) Rechargeable Battery

A rechargeable battery E10 may be provided in the unit for reducing its current-dependency.

Figure 2:
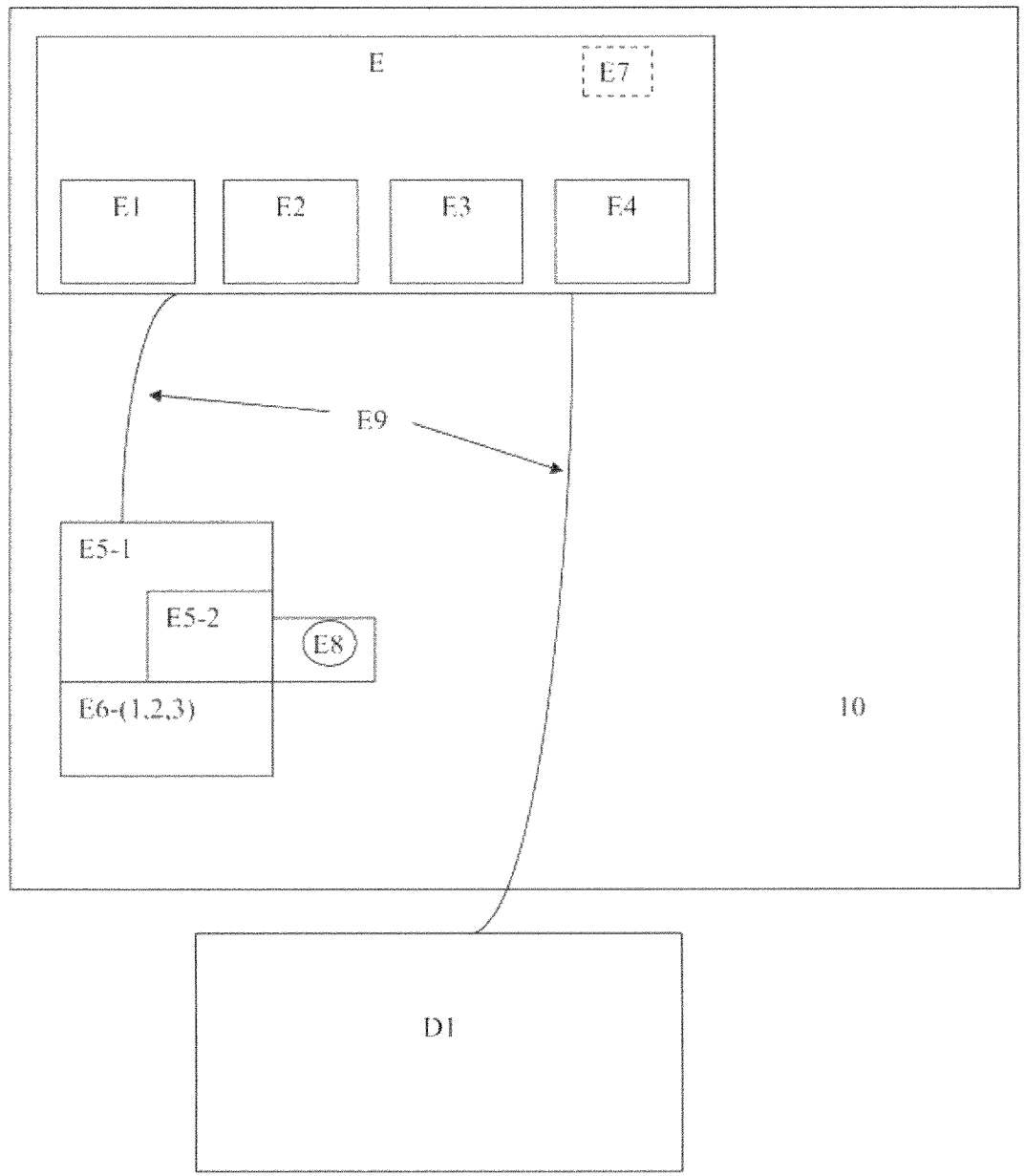
FIG. 2 is a schematic view of a unit of a home security system according to a preferred embodiment of the present invention.

FIG. 2 is a schematic view of a unit of a home security system comprising an exemplary selection of components according to one embodiment of the present invention. The devices microphone E2, infrared camera E3, and video camera E4 may be summarized as sensing devices and the data provided by said sensing devices may be summarized as sensing data. The following embodiment of a method of the present invention may use data form one or more of said sensing devices to make judgement about a suspect situation.

Software: Media Snippet

FIG. 1 is a flow chart of a home security method according to a preferred embodiment of the present invention. In said embodiment. The home security method comprises detecting a motion in a monitored room 10 through a motion sensor E1, starting data collection through at least a first sensing device and a second sensing device E2, E3, E4, transmitting said collected data to a computing device D1 comprising a data analysis unit, detecting a potentially dangerous situation through the data analysis unit by analyzing said collected data, transmitting a relevant snippet of data of said first sensing device from the computing device D1 to a first randomly selected service center server, evaluating said snippet of data of said first sensing device through a first service center operator as being related to "definitely a dangerous situation", "definitely no dangerous situation" or "unclear", if "unclear" was chosen by said operator, transmitting the snippet of data of said first sensing device to a second randomly selected service center server, and transmitting the snippet of data of said first sensing device along with the evaluation of the first operator from the first randomly selected service center server to the computing device. If at least one operator evaluates the situation as dangerous, an alarm procedure may be performed as exemplarily shown in FIG. 3. The single steps of the method are now exemplarily described in the following embodiments. The skilled person will understand that the embodiments presented herein may be combined according to personal requests or legal requirements.

In an embodiment of the present invention, a method (called "media step up snippeting") is described that guarantees both the sanctity of homeowner privacy and full access to a remote center and/or the police in case of an emergency due to the video inside the building.

a) Automated Detection of Discrepancies

All the media of information-audio, infrared movement and video is continuously transmitted wirelessly (preferably) to the remote server unit D1 and stored in the data storage unit for later use.

There, all information is run through software that detects discrepancies between normal behavior and the behavior just recorded. Therefore, in the case of the audio, audio analysis software may scan for sudden loud noises, such as screams and key words, like "help".

In the case of infrared camera date, picture analysis software scans for infrared movement comparison changes and if unnatural behavior of the person(s) inside the room 10 is detected. Unnatural behaviour comprises the temperature of the human body (which is easy to detect with infrared, as human beings have an unique temperature span from generally 35.5 to 37.5° C./100-102.5° Fahrenheit, with only regionally and then generally lower temperature ranges in cold areas from a minimum of 33.2° C. to in very hot areas a maximum of 38.2° C.; this can easily be discerned from an animal's temperature e.g. a dog's temperature of generally 38-39° C.), or movement of the body which implies sudden faint (fall) or slump of the resident (indication for heart attack or stroke). Also a drop in temperature under 35.5° Celsius, an increase over 38.29° Celsius or a drop or increase of temperature by more than 1° C. or 1.5° Fahrenheit in a short time can be a sign of an emergency.

Sudden movement the software might notice includes:
a sudden change from a vertical position to a horizontal position (fall) or
a sudden shortening of the view, which is typical for slouching in an armchair.

Regarding the video, it has to be differentiated between a single person and a group of persons. If a single person enters the room 10 and shows very rapid movements along the wall it is usually a sign for a quick opening and closing of drawers, usually a sign of a burglary. If several people are in the room 10 the interaction between them must be obeyed, such as if suddenly one person or a group of persons are sitting down or move to the wall and raise their hands, which can be assessed in combination with the infrared camera. Sudden quick movements of at least one standing person versus another person, in combination with loud noises (screams) can be a sign of domestic or other violence.

Above indications for unusual incidents are exemplary only and only parts of said indications or further indications known in the art may be used for supervision of the monitored room 10 and judgment of different situations. Using this information and the combination of signs the remote server (D1) assesses the likelihood of a problem and starts the following remote media snippet procedure:

b) Remote Media Snippet Procedure

The following procedure is run no matter which media contains the discrepancy. The transmission always states from which media source the discrepancy stems from.

Step 1

Firstly, the remote server D1 sends, preferably via VPN, an audio file to a service center computer CC randomly chosen from a set of service center servers (S1-1 to S1-*n*), the file containing the sounds of some seconds before and after the potentially dangerous event and of the event itself and a unique security code.

The computer of the remote center gives the media snippet a case number which has no information about the place the media file and information is coming from. The first operator CCO-1 can now choose "definitely a dangerous situation", "definitely no dangerous situation" or "unclear".

If unclear has been chosen, the case is continued to be handled as potential problem case, the media file being returned to one the service center computer (S1-1 to S1-*n*), again randomly chosen. This service center computer returns a notification with a security code obtained with the first media snippet to the remote server D1.

Step 2

Said remote server D1 sends an infrared photo still of the potentially dangerous event to another service center server S1-2 which it chooses by random from a set of service center servers (S1-1 to S1-*n*), again with a secure new security code.

The case is handed over to—if available—another operator CCO-2, potentially even in another service center CC, who double checks using the audio and IR photos and then acts in the same procedure as before, i.e. choosing "definitely a dangerous situation", "definitely no dangerous situation" or "unclear" on basis of the infrared picture.

Step 3

If the situation observed by the system according to the embodiment of the present invention remains 'unclear', the media file is again returned in the same manner (the case is continued to be handled as potential problem case, the media file being returned to one the service center computer (S1-1 to S1-*n*), again randomly chosen) and a first video still, i.e. only a single photo file is transmitted in the same manner.

The case is handed over to yet another operator CCO-3 who double checks audio, IR photo and single photo. If the operator again chooses 'unclear', the evaluation is again returned and eventually the video file is transmitted.

Step 4

If the situation observed by the system according to the embodiment of the present invention remains 'unclear', the media file is again returned in the same manner (the case is continued to be handled as potential problem case, the media file being returned to one the service center computer (S1-1 to S1-*n*), again randomly chosen) and a IR first video is transmitted in the same manner. The case is handed over to yet another operator CCO-4 who double checks audio, IR photo, single photo and IR video. If the operator again chooses 'unclear', the evaluation is again returned and eventually the video file is transmitted.

Step 5

Figure 3:
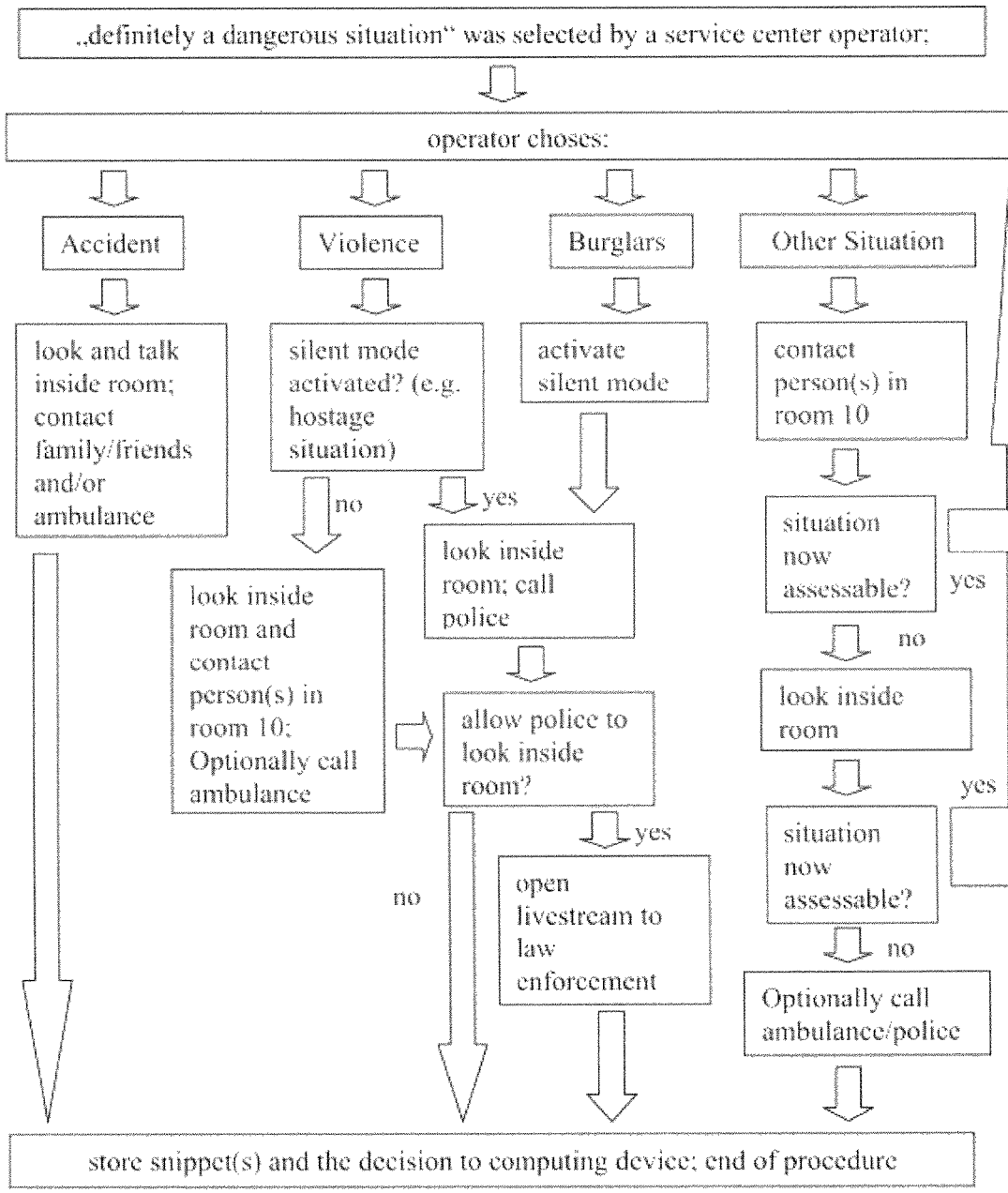
FIG. 3 is a flow chart of an alarm procedure according to a preferred embodiment of the present invention.

In this last step yet another operator CCO-4, in possession of all material for evaluation, can only choose 'definitely no dangerous situation' or 'definitely dangerous situation'. If the situation is assessed as dangerous, the operator now triggers an alarm procedure. FIG. 3 shows an alarm procedure according to a preferred embodiment of the present invention.

He may now choose, in the latter case, between:
talk to room 10—contact law enforcement P
contact ambulance
put in silent mode—contact (other) family and friends;
If permission has been given by the homeowner or resident(s) R in case of severe crimes, the operator can now be using a key encrypted in the remote server D1 and—preferably requesting the permission of a supervising operator—allow police enforcement P to look inside room 10 by opening the video camera stream to the authorities P; he may do so not only of the room 10 but of the full home.

If no danger potential is determined, the case is stored as a file along with the decision(s) of the operator(s).

If the situation is determined as dangerous, the file is stored along with the decision(s) of the operator(s).

Security Step: Double-Check

If one of the first operators chooses "definitely not a dangerous situation", still the next step is taken and double checked using the next media step up file; only if two operators in a row decide "not a dangerous" situation may the case be closed as 'not dangerous'. The same is true if one of the first operators CCO chooses definitely a dangerous situation, in this case too one more media file is checked resp a second opinion may be requested by another CCO.

Internet Security

By using a set of randomly selected servers SS1, 2, ... *n* and opening up the Internet connection only once, the remote server D1 opens the connection and keeps it open only to a string of commands beginning with the security code. Utmost Internet security from hackers is considered, as they would have to know both the security code and the server number; not only the SSL encryption needs to be cracked, but the encryption must work according to the remote server, which is chosen at random by the remote server D1. As this happens within less than a minute, an enormous amount of calculating power on the side of the hacker would be needed, and the only information received would be the next media file, which makes it not worth the effort.

By using different operators—none of which is used twice in one case—and a case number instead of a location, it is made sure that even if one operator would be interested in having a peek inside one particular room 10, he is firstly not able to know where the place is and who it belongs to. Even if he would try to gain access to the next file, he would not be able to, as the file would be sent to another operator.

This described method of protecting the privacy of the home owner while giving full access in case of an emergency shall be called "media step up snippets".

Software: Snippet Comparison with Learning/Improving Movement Database

With more cases, the software first detects unnatural behavior, yet if the operators determine it is not a dangerous pattern, the remote server D1 can train the software to recognize normal behavior for that particular homeowner and residents R.

c) Software: Blacken out Face

Using, e.g. infrared photos, and overlapping them over the photo and video, it is possible to deduce where the head of the homeowner or resident is and place a black-out pattern over the face to further protect the privacy of the user. This software is available on the market in video sequencing software and not part of the inventive claims.

d) Software: Voice Recognition

Using voice software the system can detect special patterns such as the word "help" from a person inside the room 10. Though the "media step up snippet" method described above needs to be used, as it is may be taken out of a conversation or it could be a misread radio or TV transmission.

If a particular person has been recognized to be in a room 10 by the hidden server D1, (e.g. by voice recognition and or by wearing a mobile phone or transmissive bracelet with encoded information) the voice recognition can be more precise, such as excluding immediately radio or TV transmission. In this case, the homeowner or resident could assign a particular safe word which he would otherwise not use in conversation to declare an emergency; the emergency would be detected immediately and the service center operator would immediately speak to the person inside the room 10 or a silent alert would be triggered.

According to preset rules the service center operator CCO would then be or not to be allowed to look inside the room 10 using the video camera E4.

Software: Play Dead Functionality

If a violent crime is taking place, the homeowner or resident R might be forced to switch off the unit. In this case, he could enter a number which would be pre-designated for a "play dead" mode; in this mode the units pretend to shut down the system as if the owner R had requested privacy, but actually an emergency is declared. The service center CC can look inside the rooms and hand over this media stream to local authorities, in particular to police P. They can then investigate the situation.

Hardware: Lesser Units

A lesser unit to save cost could be comprised of
  only the loudspeaker E5-1, microphone E2 and a switch E8, Keypad E6-1 and/or RFID sensor E9, and wireless connections E9,
  the loudspeaker E5-1, microphone E2, IR camera E4 and a switch E8, Keypad E6-1 and/or RFID sensor E6-3 and wireless connection E9
  the loudspeaker E5-1, microphone E2, video camera E4 and a switch E8, Keypad E6-1 and/or RFID sensor E6-3 and wireless connection E9
  the IR camera E3 and a switch E8, Keypad E6-1 and/or RFID sensor E6-3
  the video camera E4 and a switch E8. Keypad E6-1 and/or RFID sensor E6-3;
  a full version without a monitor E5-2 and touchscreen E6-2 for separate use in in a room 10 as an additional media means
  the microphone E5-1,
  the video camera E4
  or the IR camera E3, each with the wireless connection (E9) can be used.

However, above lesser units are exemplary only and are not intended to limit the present invention.

The invention claimed is:

1. A home security method, comprising:
  detecting a motion in a monitored room through a motion sensor;
  starting data collection through at least one first sensing device and at least one second sensing device;
  transmitting said collected data to a computing device comprising a data analysis unit;
  detecting a potentially dangerous situation through the data analysis unit by analyzing said collected data;
  transmitting a relevant snippet of data of said first sensing device from the computing device to a first randomly selected service center server;
  evaluating said snippet of data of said first sensing device through a first service center operator as being related to "definitely a dangerous situation", "definitely no dangerous situation" or "unclear";
  if "unclear" was chosen by said operator, transmitting the evaluation of the first operator from the first randomly selected service center server to the computing device.

2. The method according to claim 1, further comprising:
  transmitting a relevant snippet of data of said second sensing device from the computing device to a second randomly selected service center server;
  evaluating said snippet still of data of said second sensing device through a second service center operator as being related to "definitely a dangerous situation", "definitely no dangerous situation" or "unclear";
  if "unclear" was chosen by said second operator, transmitting evaluation of the second operator from the second randomly selected service center server to the computing device.

3. The method according to claim 2, further comprising:
  if said second service center operator selected "unclear", transmitting a snippet of data of a third sensing device from the computing device to a third randomly selected service center server;
  evaluating the snippet of data of the third sensing device through a third service center operator as being related to "definitely a dangerous situation", "definitely no dangerous situation" or "unclear";
  if "unclear" was chosen by said third operator, transmitting the evaluation of the third operator from the third service center server to the computing device.

4. The method according to claim 3, further comprising:
  if said third service center operator selected "unclear", transmitting the complete relevant data of data of said second sensing device from the computing device to a fourth randomly selected service center server;
  evaluating the snippet of data through a fourth service center operator as being related to "definitely a dangerous situation", "definitely no dangerous situation" or "unclear"; if "unclear" was chosen by said fourth operator, transmitting the evaluation of the fourth operator from the fourth service center server to the computing device.

5. The method according to claim 4, further comprising:
if said fourth service center operator selected "unclear", transmitting the complete relevant data of the third sensing device from the computing device to a fifth randomly selected service center server; and
evaluating all data through a fifth service center operator as being related to "definitely a dangerous situation" or "definitely no dangerous situation".

6. The method according to claim 3, wherein the method is continued until at least two different operators evaluated the situation as "definitely a dangerous situation" or "definitely no dangerous situation".

7. The method according to claim 1, wherein the case is closed if an operator selects "definitely no dangerous situation" and the case is forwarded to suitable authorities if an operator selects "definitely a dangerous situation".

8. The method according to claim 1, wherein the first service center server assigns the first data snippet with a case number, wherein the case number contains no information about the location of the monitored room.

9. A home security system, comprising:
at least one home security unit installed in a room (10) to be monitored, comprising:
a motion sensor;
a first sensing device; and
a second sensing device; and
a computing device, comprising a data analysis unit, wherein the home security system is adapted for:
detecting a motion in a monitored room (10) through a motion sensor;
starting data collection through the first sensing device and the second sensing device;
transmitting said collected data to the computing device;
detecting a potentially dangerous situation through the data analysis unit by analyzing said collected data;
transmitting a relevant snippet of data of said first sensing device from the computing device to a first randomly selected service center server;
evaluating said snippet of data of said first sensing device through a first service center operator as being related to "definitely a dangerous situation", "definitely no dangerous situation" or "unclear";
if "unclear" was chosen by said operator, transmitting the evaluation of the first operator from the first randomly selected service center server to the computing device.

10. The home security system according to claim 9, wherein the home security system is further adapted for:
transmitting a relevant snippet of data of said second sensing device from the computing device to a second randomly selected service center server;
evaluating said snippet of data of said second sensing device through a second service center operator as being related to "definitely a dangerous situation", "definitely no dangerous situation" or "unclear";
if "unclear" was chosen by said second operator, transmitting the evaluation of the second operator from the second service center server to the computing device.

11. The home security system according to claim 10, wherein the home security system is further adapted for:
if said second service center operator selected "unclear", transmitting a snippet of data of a third sensing device from the computing device to a third randomly selected service center server;
evaluating the snippets of data of said first and second sensing device through a third service center operator as being related to "definitely a dangerous situation", "definitely no dangerous situation" or "unclear";
if "unclear" was chosen by said third operator, transmitting the evaluation of the third operator from the third service center server to the computing device.

12. The home security system according to claim 11, wherein the home security system is further adapted for:
if said third service center operator selected "unclear", transmitting the complete relevant data of said first sensing and said second sensing device from the computing device to a fourth randomly selected service center server; and
evaluating the data of said first and second sensing device through a fourth service center operator as being related to "definitely a dangerous situation" or "definitely no dangerous situation".

13. The home security system according to claim 11, wherein the home security system is further adapted for:
if said fourth service center operator selected "unclear", transmitting the complete relevant data of the third sensing device from the computing device to a fifth randomly selected service center server; and
evaluating all data through a fifth service center operator as being related to "definitely a dangerous situation" or "definitely no dangerous situation".

14. The home security system according to claim 11, wherein the method is continued until at least two different operators evaluated the situation as "definitely a dangerous situation" or "definitely no dangerous situation".

15. The home security system according to claim 9, wherein the case is closed if an operator selects "definitely no dangerous situation" and the case is forwarded to suitable authorities if an operator selects "definitely a dangerous situation".

16. The home security system according to claim 9, wherein the first service center server assigns the first data snippet with a case number, wherein the case number contains no information about the location of the monitored room.

* * * * *